US008060597B2

(12) United States Patent
Wang et al.

(10) Patent No.: US 8,060,597 B2
(45) Date of Patent: Nov. 15, 2011

(54) METHOD FOR IMPLEMENTING SERVICE INTERACTION IN THE IP MULTIMEDIA SUBSYSTEM (75) Inventors: Jun Wang, Shenzhen (CN); Zhenwu Hao, Shenzhen (CN)

(73) Assignee: ZTE Corporation (JP)

( * ) Notice: Subject to any disclaimer, the term of this patent is extended or adjusted under 35 U.S.C. 154(b) by 32 days.

(21) Appl. No.: 12/665,679

(22) PCT Filed: Dec. 29, 2007

(86) PCT No.: PCT/CN2007/003947
§ 371 (c)(1),
(2), (4) Date: Dec. 18, 2009

(87) PCT Pub. No.: WO2009/003337
PCT Pub. Date: Jan. 8, 2009

(65) Prior Publication Data
US 2010/0185772 A1    Jul. 22, 2010

(30) Foreign Application Priority Data

Jul. 2, 2007  (CN) .......................... 2007 1 0122728

(51) Int. Cl.
G06F 15/173    (2006.01)

(52) U.S. Cl. ........ 709/223; 709/203; 709/227; 709/230; 709/231; 370/474

(58) Field of Classification Search .................. 709/227, 709/230, 231, 203; 370/474
See application file for complete search history.

(56) References Cited

U.S. PATENT DOCUMENTS

| 7,822,035 B2 * | 10/2010 | Mutikainen et al. | 370/392 |
| 2004/0243697 A1 * | 12/2004 | Otsuka et al. | 709/223 |
| 2006/0168220 A1 * | 7/2006 | Katoh et al. | 709/225 |
| 2006/0268781 A1 | 11/2006 | Svensson et al. | |

(Continued)

FOREIGN PATENT DOCUMENTS

CN    1925461 A    3/2007

(Continued)

OTHER PUBLICATIONS

Huawei: "It shall be possible for the UE and AS to set the ICSI and IARI in the SIP response message," 3GPP Draft; C1-070208, 3rd Generation Partnership Project (3GPP), Mobile Competence Centre; 650, Route Des Lucioles; F-06921 Sophia-Antipolis Cedex, France, vol. CT WG1, no Vancouver, Canada; 20070129, Jan. 29, 2007 XP050024497.

*Primary Examiner* — Oanh Duong
(74) *Attorney, Agent, or Firm* — Marger Johnson & McCollom, P.C.

(57) ABSTRACT

A method for implementing service interaction in the IP multimedia subsystem is disclosed in the present invention, wherein each service logic has a unique service identifier. The method comprises the following steps: (a) a Serving-Call Session Control Function (S-CSCF) sends a session initiation protocol (SIP) request message to the service capability interaction manager (SCIM) or to the application server (AS) to which a user requests for a service; (b) after the AS or SCIM has received the request and has executed this service, it inserts the service identifier of this service into the SIP request, and returns the SIP request with the service identifier to said S-CSCF. With the present invention, most of the service interaction requirements can be satisfied.

13 Claims, 3 Drawing Sheets

U.S. PATENT DOCUMENTS

| | | |
|---|---|---|
| 2007/0086582 A1* | 4/2007 | Tai et al. .................. 379/114.01 |
| 2007/0263835 A1* | 11/2007 | Yamazaki ..................... 379/243 |
| 2008/0032695 A1* | 2/2008 | Zhu et al. ..................... 455/442 |
| 2008/0101412 A1* | 5/2008 | Schwagmann et al. ....... 370/474 |
| 2008/0132161 A1* | 6/2008 | Chen et al. .................. 455/3.05 |
| 2008/0166994 A1* | 7/2008 | Ku et al. ...................... 455/406 |
| 2008/0177889 A1* | 7/2008 | Beyer et al. ................... 709/230 |
| 2008/0261593 A1* | 10/2008 | Wong et al. ................ 455/435.1 |
| 2010/0020790 A1* | 1/2010 | Pallares Lopez et al. ..... 370/352 |

FOREIGN PATENT DOCUMENTS

| | | |
|---|---|---|
| WO | 2006125471 A1 | 11/2006 |

\* cited by examiner

METHOD FOR IMPLEMENTING SERVICE INTERACTION IN THE IP MULTIMEDIA SUBSYSTEM

RELATED APPLICATION DATA

This application claims priority and benefit of PCT/CN2007/003947, filed Dec. 29, 2007, which claims priority from Chinese patent application no. 200710122728.1, filed Jul. 2, 2007, the entire contents of which are hereby incorporated by reference.

TECHNICAL FIELD

The present invention relates to the radio communication field, and more especially, to a method for implementing service interaction in the IP multimedia subsystem network.

BACKGROUND ART

The IMS (IP Multimedia Subsystem) is introduced at the stage of 3GPP ($3^{rd}$ Generation Partner Project) R5, in which the call control is totally independent from the service logic compared with the soft-switch network, and the IMS core network only controls the call, while the service logic is implemented by the service layer, and the interface for the IMS core network S-CSCF (Serving-Call Session Control Function) interacting with the AS (Application Server) is referred to as ISC (IP multimedia service control), in which the SIP (Session Initiation Protocol) is still applied.

In the service layer in the IMS network, there might be multiple independent ASs to deal with subscription service of one user, which brings the problem of interaction among several services, since there are correlation relationships among different service logics, for example, priorities should be kept among some service logics, some other service logics depend on each other, and still some others exclude with each other, in order to guarantee that the customers can get what they expect, the network should guarantee that the relationships among these service logics can be met, thus guarantee that the whole call is properly processed.

In the present protocol standards, it mainly relies on the iFCs (Initial filter criteria) to trigger several services, and one user might subscribe with several iFCs among which the priorities should be kept, and each iFC corresponds to one AS. The principle of iFC triggering is to make the text regular expression matching for the whole initial request, thus to trigger the service according to the any characteristic sub-string in the SIP message, which, combined with the fact that the AS name subscribed with the iFC can carry some characteristic parameters, can implement the following simple service interactions: 1) determine the triggering order of several ASs; 2) judge whether to trigger the next AS or not according to the specific content included in the SIP request; 3) when an AS implements several service logics, the AS name in the iFC is subscribed with a characteristic sub-string which is carried in the Route header in the request which triggers the AS, and the AS can determine which service logic to be implemented according to this characteristic sub-string; 4) for two adjacent ASs in the subscription, whether the latter AS is triggered or not is determined by the SIP message characteristic sub-string in the request forwarded by the former one.

However, implementing service nesting just according to the iFC has its limitations, 1) Any intermediate AS in the call chain can take the role of the B2BUA (Back to Back User Agent, an implementation mode of the SIP server), and regenerate a SIP request totally, thus the result processed by the former AS is totally removed from the characteristic in the SIP message, and the subsequent iFC matching in the subscription cannot be determined according to the services processed previously; 2) The AS in the upstream of the subscription cannot obtain processing information of the AS in the downstream, and when some characteristics of the service conflict, there will be error in the call processing.

The industry has already offered a method for implementing the interaction among several services by setting a SCIM (Service Capability Interaction Manager) between the S-CSCF and the AS, and there is special subject research in the 3GPP R8. The configuration of the SCIM is of the following three kinds: 1) centralized, in which all ASs interface with the S-CSCF through the same SCIM; 2) distributed, in which each AS might have built-in SCIM; 3) combined, in which some ASs can interact with the S-CSCF through the same SCIM, while some others have built-in SCIMs. In the centralized configuration, the SCIM can totally control the interaction among the ASs, and it is relatively easy to obtain the processing condition of all ASs participating in one call, however, due to the performance, deployment cost and the condition that the calling and called parties are in different domains, it is difficult for one SCIM to control all the ASs. In distributed or combined configuration, the interaction should be enforced among the SCIMs. However, on the whole, the definition for the SCIM capability is relatively vague, and it still needs time to be developed.

SUMMARY OF THE INVENTION

The present invention offers a method for implementing service interaction in the IP multimedia subsystem to perform the service interaction with relatively low cost.

In order to solve the above technical problem, the present invention offers a method for implementing service interaction in the IP multimedia subsystem, characterized in that, every service logic has a unique service identifier, and said method comprises the following steps:

(a) The S-CSCF sends a SIP request to the SCIM or the AS to which the user requests for services;

(b) After said AS or SCIM receives said SIP request and executes this service, it inserts the service identifier of this service into said SIP request and returns the SIP request with the service identifier to said S-CSCF.

Furthermore, there is step (c) following step (b), and when said S-CSCF sends the SIP request to another AS or SCIM, said SIP request includes the service identifiers of all executed services.

Furthermore, when said S-CSCF needs to send the SIP request with the service identifier to the user equipment (UE), after the border network element receives said SIP request, it stores all the service identifiers in the request, and after the user returns the response message, it inserts the stored service identifiers into said response message and returns the message to said S-CSCF.

Furthermore, when said S-CSCF receives the response message with said service identifier, it sends said response message to the related AS or SCIM according to iFC and the service identifiers in said response message.

Furthermore, in said step (a), the S-CSCF determines said AS or SCIM to which the user requests for the service according to the iFC and/or the service identifier recorded in the SIP.

Furthermore, said iFC records one or more of the following items: the priority of service execution, mutual exclusion of the services, partial mutual exclusion of the services, dependence of the services, and partial dependence of the services.

Furthermore, said service identifier at least comprises the executed service logic and the identifier of the AS executing said service.

Furthermore, said service identifier is the IP multimedia subsystem communication service identifier.

Furthermore, said AS or SCIM inserts the service identifier into the service execution history (SEH) of said SIP.

Furthermore, said S-CSCF is the original or terminating S-CSCF, and when the AS or SCIM inserts the service identifier after executing the service, it distinguishes the service identifier of the calling service from that of the called service in said SEH; or, after the AS or the SCIM that receives the SIP request from the original S-CSCF executes the service, it inserts the service identifier of this service into the original SEH in said SIP request, and after the AS or the SCIM that receives the SIP request from the terminating S-CSCF executes the service, it inserts the service identifier of this service into the terminating SEH in said SIP request.

Furthermore, in said step (b), after said AS receives said SIP request, it judges whether to execute this service or not according to the service interaction relationship and/or the service configuration information by the AS itself; or, after said SCIM receives said SIP request, it judges whether to execute this service or not according to the iFC and the configuration information of the service requested by the user.

Furthermore, after said related AS or SCIM receives said response message, it judges whether to execute its own subsequent service logic or not according to the iFC and/or the service identifier in said response message.

The present invention offers a method which can easily implement the service interaction in the IMS network, the method can meet the requirement of the service interaction in most cases with no need for the network configuring a complicated SCIM, and the requirement of the service interaction comprises: 1) total exclusion among the services; 2) partial exclusion among the services; 3) total dependence among the services; 4) partial dependence among the services, however, the more complicated interaction requirement, such as the dynamic adjustment for service execution order, should turn to other technologies, and their description is omitted here. The objective of the present invention is to extend the IMS network performance rather than replace the SCIM, and this extension can be used by the SCIM, that is, the SCIM and AS individually charge in the network of the SCIM for the related service interaction executed by the AS in the following procedure in the present invention, and the SCIM can use the method offered in the present invention to determine the mutual exclusion and dependence among the ASs.

THE PREFERRED EMBODIMENTS OF THE PRESENT INVENTION

The thought of the present invention is as follows:

A unique service logic identifier which can be a character string is assigned for each service logic, and also a SIP syntax component SEH (Services Execution History) is configured with its main characteristic being that it can store several service logic identifiers, and when a call passes through every AS, the AS should insert its executed service logic identifiers into the SEH, therefore, the downstream server can check the executed service logics in the SEH to determine its own execution logic, thus implement the interaction between the downstream and the upstream services; meanwhile, after all services are executed, the SEH should be sent back to the upstream server in the response message, and the upstream server can check the content to determine the subsequent service logic, thus implement the interaction between the upstream and downstream services.

The SEH defined in the present invention can be a field in the SIP header or can be a message body, and no matter what form it has, it only affects the way by which the related function entity operates the SIP message, rather than has influence on the implementation procedure of the present invention. For simplification while not inducing ambiguity, the SEH is applied in the following description.

The specified description is as follows:

1) An identifier is assigned to each service logic, the identifier should be unique in the whole network by applying the available standard organization suggestions or by distributing in a unified way by the operators. The AS can define the sub-state of the service execution (that is, the service is divided into several steps which are gradually implemented in the several message interactions in the call, thus, according to the implementation of the present invention, some steps might or might not be executed to achieve the mutual exclusion/dependence between the services), and one AS can execute several service logics, thus can assign several service identifiers.

This identifier can be the ICSI (IMS Communication Service Identifier) offered in 3GPP R7 or the ones of other type. The operators can define the relationship matrix among the applications, and this relationship can be one or more of dependence, mutual exclusion, partial dependence, and partial mutual exclusion, and the AS/SLIM can execute the subsequent service on the basis of the relationship matrix.

2) After executing a service logic, the identifier of this service logic should be inserted into the SEH in the SIP message, and if the AS receives the triggering request while does not execute any logic due to the configuration or the service mutual exclusion, it does not add any information in the SEH. Since the SEH should exist through the whole call to really reflect the services execution history so as to implement the service interaction, thus the AS, no matter being B2BUA or Proxy, can only add its own identifiers, rather than delete, modify the existing service execution list.

3) The subscribed iFC can implement mutual exclusion and dependence among different services through the SEH matching, no matter the subscription order of two related services are adjacent or not. The iFC is a character string matching criteria, and the matching is executed by the S-CSCF, and it can match whether there is or is no some service logic identifier in the SEH, and the matching result is that whether the call should be sent to one AS to be executed or not.

4) The subsequent ASs in the call chain can determine whether their own service logics should be executed or not according to the SEH content recorded by the upstream AS, or apply different service logic details.

5) The SEH should maintain their order to so as to determine the next service logic subsequently according to the combination of several executed services and the time order relationship.

6) Under some conditions, the service interaction between the original call and the terminating call should be implemented, therefore, the original call/terminating call label should be inserted in the SEH, or use different SEHs to represent the service execution history of the original call and the terminating call. No matter it is represented in the SEH or individually, they are respectively referred to as O-SEH and T-SEH in this specification, and the latter one can reduce the complication of the subscribed iFC regular expression.

7) The SEH is the service information and does not need to be exposed to the non-trust area or the user side. The border network element (including the P-CSCF) should delete all the SEH sent to the non-trust area and those in the terminating SIP message; for the initial SIP request, the border network element should store the content before deleting the SEH, and insert the stored SEH after receiving the response of any non-100 Trying (a temporary response representing that the server of the next node has received this request but has not executed the specific activity of this request, and the difference between the 100 Trying response and the other temporary responses is that the 100 Trying response cannot be forwarded to the upstream by a stateful proxy) of the initial SIP request of the other side. For example, the AS will send the message to the P-CSCF, while the P-CSCF will delete SEH before sending the message to the terminal, and after receiving the terminal response, it re-inserts the SEH. The objective is to let the upstream ASs in the call chain know the service execution in the downstream, based on which to judge whether enable some characteristics in the subsequent logics of the executed service or not.

The present invention will be described in further detail in combination with the accompanying figures and the embodiments.

Figure 1:
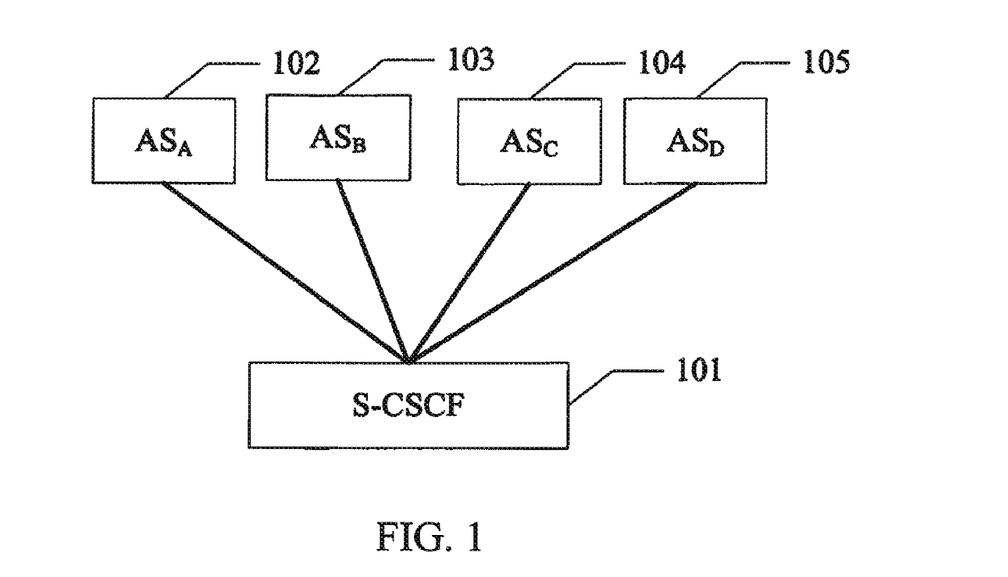
FIG. 1 is a block of the entities in accordance with an embodiment of the present invention.
Figure 2:
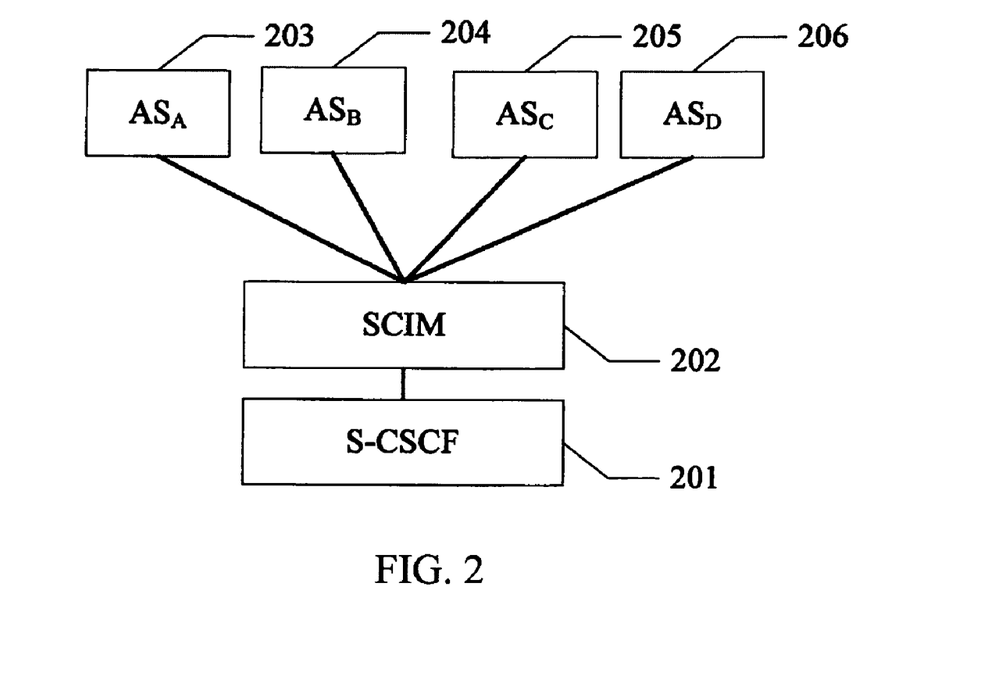
FIG. 2 is the block of the network entity having the SCIM in accordance with an embodiment of the present invention.

FIG. 1 is a block of the entities in accordance with an embodiment of the present invention, wherein 101 is the S-CSCF, 102 to 105 are four ASs executing different logics, respectively. FIG. 2 is a block of the entities in the network configured with the SCIM in accordance with the present invention, wherein 201 is the S-CSCF, 202 is the centralized SCIM responsible for managing the service interaction among several ASs, and 204 to 206 are four ASs executing different logics.

Figure 3:
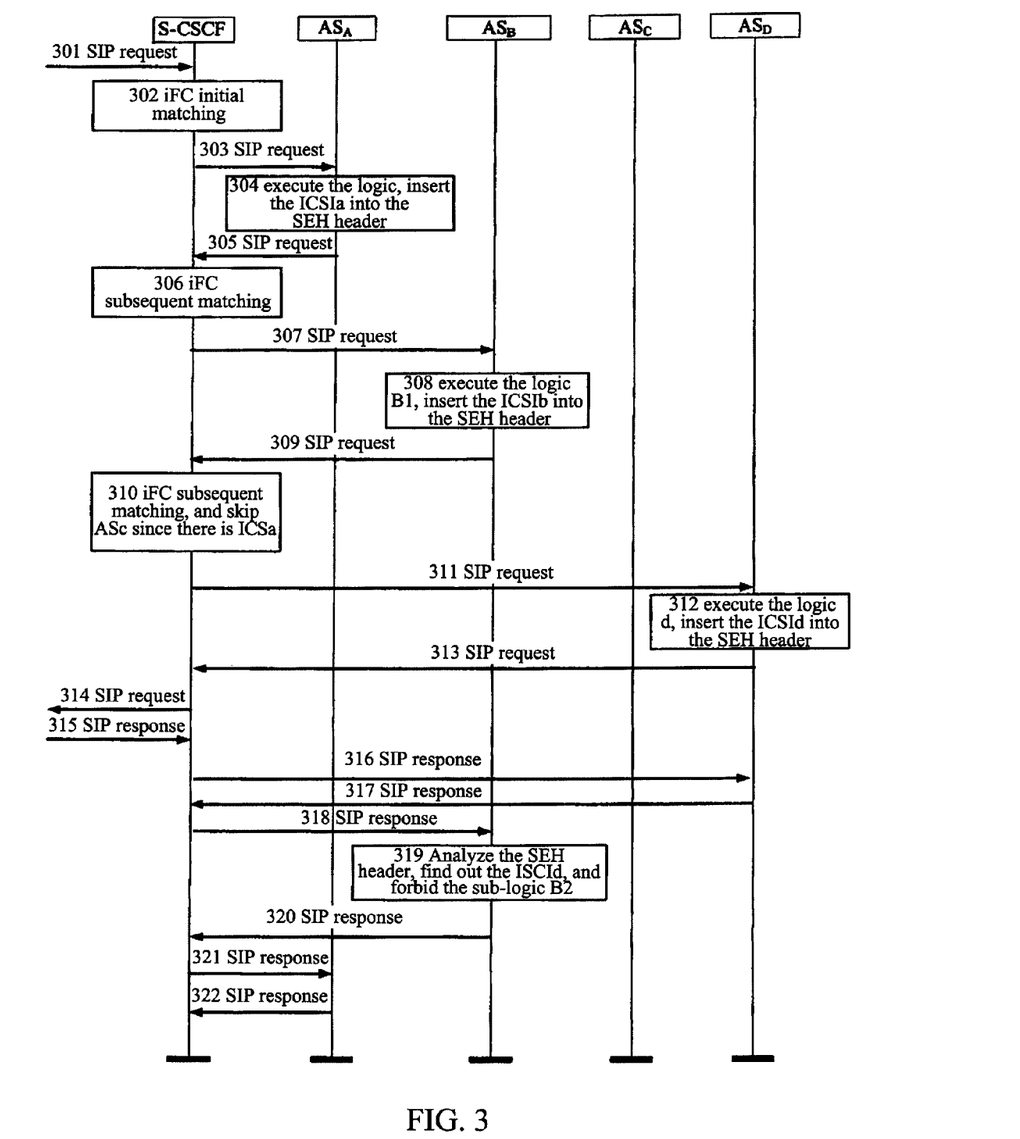
FIG. 3 is a flow chart of implementing the mutual exclusion and the partial mutual exclusion in accordance with the first embodiment of the present invention.

FIG. 3 is an embodiment implementing the service exclusion. This embodiment has four application logics, A, B, C and D respectively, wherein, applications A and C exclude with each other, and the logic B is divided into two sub-logics B1 and B2, wherein, characteristic B2 is executed after the session is established and excludes with the logic D.

S301 to S303, the S-CSCF receives the SIP request from one UE, and triggers the call to the application A according to the iFC initial matching result;

S304 to S305, after application A executes the service logic, it inserts its application identifier $ICSI_A$ into the SEH to be used by the subsequent service interaction, and returns the message to the S-CSCF;

The AS should combine the service interaction relationship and its configuration information for the service (such as the user's subscription service information) to judge whether to execute this service or not.

S306 to S307, the S-CSCF continues to match the iFC and sends the received request message to B;

The S-CSCF should refer to the SEH content in the subsequent iFC matching. S308 to S309, after application B executes the characteristic B1 of the service logic, it inserts its application identifier $ICSI_B$ into the SEH and returns the message to the S-CSCF, determine whether the sub-function B2 of application B is executed or not according to the SEH content in the response message;

S310, the S-CSCF continues to match iFC, and since "if the SEH indicates that logic A has been executed, the logic C will not be executed" is subscribed in iFC, this iFC matching fails, continue to match the next iFC;

"Logic A has been executed" is determined according to whether there is $ICSI_A$ in the SEH or not, and in this step the mutual exclusion between the services A and C is implemented based on SEH.

If there is a SCIM, the analysis function of the iFCs might be executed in the SCIM. In other embodiments of the present invention, the S-CSCF also might send the SIP request to application C and application A judges whether to execute its own service logic or not according to whether there is $ICSI_A$ in the SEH or not.

S311, the S-CSCF continues to match the next iFC and sends the SIP request to D;

S312 to S313, after application D executes the service logic, it inserts its application identifier $ICSI_D$ into the SEH and returns the message to the S-CSCF;

S314 to S317, the S-CSCF forwards the request message out, and receives the response message later which carries the whole SEH generated in the request;

S318 to S322, the S-CSCF forwards the response message to applications D, B and A in turn;

The border network element (such as P-CSCF) deletes the SEH in the request message and stores it in local, after the P-CSCF receives the response message from the UE, it inserts the stored SEH into the response message, and if the service fails and the P-CSCF does not receive the response message, it will generate a failure response and still insert the stored SEH into the response message. Therefore, the response message received by the S-CSCF has the whole SEH generated in the request.

Since application C is still not triggered during the call, the S-CSCF will not send the response message to C.

In S319, application B checks the SEH in the response message and finds out that application D has been executed, then records it, and further forbids the execution of the subsequent sub-logic B2;

This step implements the partial mutual exclusion function of applications B and D. S320, application B forwards the response message to the S-CSCF. The process of the subsequent message execution by the S-CSCF and other ASs will be omitted here.

If this is the network configured with the SCIM shown in FIG. 2, some or all of S304 to S305, S308 to S310, and S312 to S313 can be executed by the SCIM. For example, after the SCIM receives the SIP request, it judges whether to execute this service or not according to the iFC and the configuration message of the service requested by the user (such as the user's subscription service information).

If the SCIM can know the AS execution sub-state, S319 can be executed by the SCIM, that is, after the SCIM receives said SIP request, it judges whether to execute the subsequent service logic or not according to the iFC and the service identifier in the response message.

Furthermore, this embodiment can subscribe A, B, C and D to both the calling user and the called user, and the process is almost the same, for example, A and B are the calling user services, and C and D are the called user services, therefore the process is the same except the following step is added in S310 that the original S-CSCF sends the message to the terminating S-CSCF and the subsequent C and D services communicate with the terminating S-CSCF.

Figure 4:
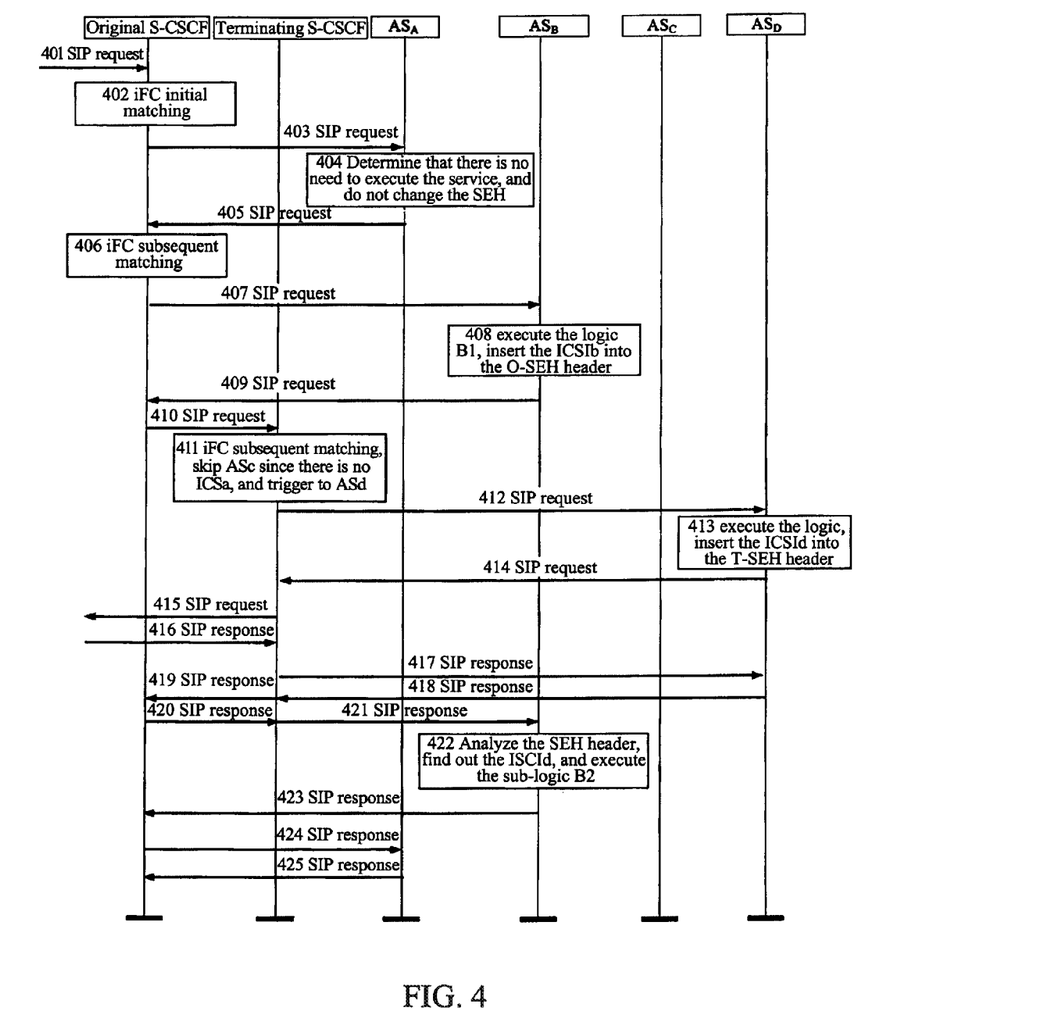
FIG. 4 is a flow chart of implementing dependence and partial dependence in accordance with the second embodiment of the present invention.

FIG. 4 is an embodiment to implement the service exclusion between the calling and the called parties. This embodiment has four application logics, A, B, C and D respectively, and applications A and B are the calling services, and C and D are the called services, wherein application C depends on application A, and logic B is divided into two sub-logics B1 and B2, wherein, characteristic B2 is executed after the session is established and depends on the logic D, that is, only the application logic D is executed, the sub-logic B2 is executed.

This embodiment divides the SEH into the original SEH (O-SEH) and the terminating SEH (T-SEH) to distinguish the different SEH of the original call and terminating call, and in the practical implementation, O-SEH and T-SEH can be different parameters in the same SIP header, or can be two individual SIP headers. When it is referred as SEH only, it means that the O-SEH and T-SEH are included.

S401 to S403, the original S-CSCF receives a SIP request, and then triggers the call to application A according to the iFC initial matching result;

S404 to S405, by analyzing the message or other context information, application A determines that it does not need to execute its service logic, and only forwards the SIP request to the S-CSCF rather than inserts any content into the SEH;

S406 to S407, the original S-CSCF continues to match the iFC and sends the request message to B;

S408 to S409, after application B executes the characteristic B1 of the service logic, it inserts its application identifier $ICSI_B$ into the O-SEH, and returns the message to the original S-CSCF;

The sub-function B2 of application B judges whether to execute the service logic or not according to the SEH content in the response message.

S410, the original S-CSCF sends the request to the terminating S-CSCF;

S411, the terminating S-CSCF matches the iFC, and since "if the SEH indicates that logic A has been executed, the logic C will be executed, otherwise the logic C will not be executed" is subscribed in iFC, and since the logic A has not been executed, the iFC matching fails, the terminating S-CSCF continues to match the next iFC;

"logic A has been executed" is determined according to whether there is $ICSI_A$ in the SEH or not, and in this step the dependence between the services A and C is implemented based on SEH.

S412, the terminating S-CSCF continues to match the next iFC and sends the call to D;

S413 to S414, after application D executes the service logic, it inserts its application identifier ICSID into the T-SEH and returns the message to the terminating S-CSCF;

S415 to S418, the terminating S-CSCF forwards the request message out, and receives the response message later, the border network element (such as P-CSCF) deletes the SEH in the request message and stores it in local when sending the request message, after the P-CSCF receives the response message, it inserts the stored SEH into the response message, thus the response message received by the terminating S-CSCF carries the whole SEH generated in the request;

S419 to S425, the original and terminating S-CSCFs forward the response message to the applications D, B and A in turn;

In S422, application B checks the SEH in the response message and finds out that application D has been executed, thus sub-logic B2 is executed;

This step implements the partial dependence function of applications B and D. In this step, if there is no $ICSI_D$ found in the SEH, it means that application D is not executed and thus the sub-logic B2 will not be executed.

S423, application B forwards the response message to the original S-CSCF.

The process of the subsequent message execution by the S-CSCF and other ASs will be omitted here.

If this is the network configured with the SCIM shown in FIG. 2, some or all of S404 to S405, S408 to S409, S411, and S413 to S414 can be executed by the SCIM.

The core of the present invention is that the totally new extended SIP header SEH is applied and the execution criteria for the header by the related network element is defined, and the AS in the call execution can determine its own behavior by operating and checking the SEH content, thus the method for the IMS services interaction is implemented.

With the IMS service interaction mechanism described in the present invention, not only the interaction among the subscription services at either party participating in the call, but also the service interaction between the calling and the called parties can be implemented, for example, the two parties participating in the call belong to different operators, thus it is impossible to use the same SCIM to control the service interaction, however, with this extension, the SEH information can be transmitted in the calling and called networks, thus there is still possibility to use the present invention to implement the service interaction between the calling and the called parties.

INDUSTRIAL APPLICABILITY

The present invention is applied in the IMS network to realize the interaction of the related service executed by the AS in the IMS, and in the network configured with the SCIM, the SCIM can use the method offered in the present invention to implement the mutual exclusion and dependence among the ASs.

The invention claimed is:

1. A method for implementing service interaction in an internet protocol multimedia subsystem, wherein, each service logic has a unique service identifier, and said method comprises the following steps:
(a) sending, by a serving-call session control function, a session initiation protocol request to a service capability interaction manager or an application server to which a user requests a service; and
(b) after said application server or service capability interaction manager receives said session initiation protocol request and executes the service, inserting by said application server or service capability interaction manager the service identifier of the service into said session initiation protocol request and returning the session initiation protocol request with the service identifier to said serving-call session control function to identify accomplishment of processing the service.

2. A method of claim 1, wherein, following the step (b), when said serving-call session control function sends the session initiation protocol request to other application server or service capability interaction manager, said session initiation protocol request includes the service identifiers of all executed services.

3. A method of claim 2, wherein, in said step (b), after said application server receives said session initiation protocol request, the application server judges whether to execute the service or not according to service interaction relationship and/or configuration information of the service by the application server itself; or, after said service capability interaction manager receives said session initiation protocol request, the service capability interaction manager judges whether to execute the service or not according to the initial filter criteria and the configuration information of the service requested by the user.

4. A method of claim 2, wherein, when said serving-call session control function needs to send the session initiation protocol request with the service identifier to a user equipment, after a border network element receives said session initiation protocol request, the border network element stores all the service identifiers in the request, and after the user returns a response message, the border network element inserts the stored service identifiers into said response message and returns the message to said serving-call session control function.

5. A method of claim 1, wherein, when said serving-call session control function needs to send the session initiation protocol request with the service identifier to a user equipment, after a border network element receives said session initiation protocol request, the border network element stores all the service identifiers in the request, and after the user returns a response message, the border network element inserts the stored service identifiers into said response message and returns the message to said serving-call session control function.

6. A method of claim 5, wherein, when said serving-call session control function receives the response message with the service identifier, the serving-call session control function sends said response message to the related application server or service capability interaction manager according to an initial filter criteria and the service identifiers in said response message.

7. A method of claim 6, wherein, after said related application server or service capability interaction manager receives said response message, the related application server or service capability interaction manager judges whether to execute its own subsequent service logic or not according to the initial filter criteria and/or the service identifier in said response message.

8. A method of claim 1, wherein, in said step (a), the serving-call session control function determines said application server or service capability interaction manager to which the user requests for the service according to the initial filter criteria and/or the service identifier recorded in the Session Initiation Protocol message.

9. A method of claim 8, wherein, said initial filter criteria records one or more of the following items: a priority of service execution, exclusion of the services, partial exclusion of the services, dependence of the services, partial dependence of the service.

10. A method of claim 1, wherein, said service identifier at least comprises the executed service logic and the identifier of the application server executing said service.

11. A method of claim 1, wherein, said service identifier is the internet protocol multimedia subsystem communication service identifier.

12. A method of claim 1, wherein, said application server or service capability interaction manager inserts the service identifier into a service execution history list in said session initiation protocol.

13. A method of claim 12, wherein, said serving-call session control function is an original serving-call session control function or a terminating serving-call session control function, and when the application server or the service capability interaction manager inserts the service identifier after executing the service, the application server or the service capability interaction manager differentiates the service identifier of a calling service from the service identifier of a called service in said service execution history list; or, after the application server or the service capability interaction manager that receives the session initiation protocol request from the original serving-call session control function executes the service, the application server or the service capability interaction manager inserts the service identifier of the service into the original service execution history list in said session initiation protocol request, and after the application server or the service capability interaction manager that receives the session initiation protocol request from the terminating serving-call session control function executes the service, the application server or the service capability interaction manager inserts the service identifier of the service into the terminating service execution history list in said session initiation protocol request.

* * * * *

UNITED STATES PATENT AND TRADEMARK OFFICE
CERTIFICATE OF CORRECTION

PATENT NO. : 8,060,597 B2  Page 1 of 1
APPLICATION NO. : 12/665679
DATED : November 15, 2011
INVENTOR(S) : Jun Wang and Zhenwu Hao It is certified that error appears in the above-identified patent and that said Letters Patent is hereby corrected as shown below:

IN THE SPECIFICATIONS:

Column 4, line 45, "AS/SLIM" should read --AS/SCIM--;

IN THE CLAIMS:

Column 8, line 44, claim 1, "intemet" should read --internet--.

Signed and Sealed this
Thirty-first Day of January, 2012

David J. Kappos
*Director of the United States Patent and Trademark Office*